United States Patent
Kondo et al.

(10) Patent No.: US 6,984,904 B2
(45) Date of Patent: Jan. 10, 2006

(54) VOLTAGE REGULATOR STRUCTURE OF VEHICLE GENERATOR

(75) Inventors: Seiji Kondo, Kariya (JP); Hitoshi Wada, Fuwa-gun (JP); Motoki Ito, Obu (JP); Hiroshi Ishida, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/868,911

(22) Filed: Jun. 17, 2004

(65) Prior Publication Data
US 2005/0168082 A1 Aug. 4, 2005

(30) Foreign Application Priority Data
Jun. 18, 2003 (JP) .............................. 2003-172817
Jan. 19, 2004 (JP) .............................. 2004-010999

(51) Int. Cl.
*H02K 19/36* (2006.01)
(52) U.S. Cl. ..................................... 310/68 D; 310/71
(58) Field of Classification Search .............. 310/68 R, 310/68 D, 89, 88
See application file for complete search history.

(56) References Cited

U.S. PATENT DOCUMENTS

| 3,731,126 | A | * | 5/1973 | Hagenlocher et al. .... 310/68 R |
| 4,387,314 | A | * | 6/1983 | Iwaki et al. ................... 310/88 |
| 5,742,108 | A | | 4/1998 | Kuribayashi et al. ......... 310/89 |
| 6,492,752 | B2 | | 12/2002 | Ishida .......................... 310/71 |
| 6,664,674 | B2 | * | 12/2003 | Ihata ............................ 310/64 |
| 2002/0135246 | A1 | * | 9/2002 | Lemke et al. ................. 310/89 |
| 2004/0155540 | A1 | * | 8/2004 | Nakamura et al. ........ 310/68 D |
| 2004/0217663 | A1 | * | 11/2004 | Kumagi ....................... 310/71 |
| 2005/0127777 | A1 | * | 6/2005 | Kashihara et al. .......... 310/239 |
| 2005/0151516 | A1 | * | 7/2005 | Montgomery et al. ........ 322/45 |

FOREIGN PATENT DOCUMENTS

| JP | A 7-194060 | 7/1995 |
| JP | A 7-303345 | 11/1995 |
| JP | A 8-84502 | 4/1996 |
| JP | A 2001-28857 | 1/2001 |
| JP | A 2001-78383 | 3/2001 |
| JP | A 2002-17067 | 1/2002 |

* cited by examiner

*Primary Examiner*—Darren Schuberg
*Assistant Examiner*—Erik Preston
(74) *Attorney, Agent, or Firm*—Oliff & Berridge, PLC

(57) ABSTRACT

A rotary electric machine includes a frame, a rectifying unit fixed to the frame, a rotor accommodated in the frame, a voltage regulator having a regulator section, an arm extending from the regulator section in a circumferential direction and a connector. The arm has a mounting potion at an end, and the connector is disposed between the mounting potion and the regulator portion.

16 Claims, 7 Drawing Sheets

US 6,984,904 B2

VOLTAGE REGULATOR STRUCTURE OF VEHICLE GENERATOR

CROSS REFERENCE TO RELATED APPLICATION

The present application is based on and claims priority from Japanese Patent Applications 2003-172817, filed Jun. 18, 2003 and 2004-10999, filed Jan. 19, 2004, the contents of which are incorporated herein by reference.

BACKGROUND OF THE INVENTION

1. Field of the Invention

The present invention relates to a rotary electric machine, such as an ac generator for a vehicle.

2. Description of the Related Art

Recently, slanted nose type vehicles to reduce air resistance have appeared on the market. In addition, the engine compartment has been reduced to improve interior comfort of the passenger compartment. This trend necessarily limits the space for mounting an ac generator in the engine compartment and necessitates the ac generator more compact.

JP-A-2001-28857 proposes a compact ac generator that includes a compact rectifying unit. The compact rectifying unit includes C-shaped cooling fins that have a radially extending accommodation space in which a voltage regulator and a connector are disposed. However, because the whole portion of the voltage regulator is accommodated in the accommodation space, the location of the connector is restricted by the rectifying unit and a brush unit that is located adjacent the voltage regulator. In other words, it is rather difficult to change the location of the connector.

On the other hand, JP-A-2002-17067 or U.S. Pat. No. 6,492,752 B2 proposes detachable and watertight connector in order to increase the life time of vehicle accessories or the guarantee period thereof. Such a connector has a lock mechanism which makes the connector complicated in structure and increases the axial length. However, because a portion of the lock mechanism projects outward, it may be struck and damaged by a tool or the like during assembling.

SUMMARY OF THE INVENTION

Therefore, a main object of the invention is to improve the above-stated problems.

Another object of the invention is to omit a sealing rubber from the water tight structure that may be deteriorated by aging.

According to a main feature of the invention, a rotary electric machine includes a frame, a rectifying unit having a comparatively small accommodation space on a peripheral portion, a rotor, a voltage regulator having a regulator section disposed in the accommodation space, an arm extending outward from the regulator section in a circumferential direction and a connector. In the voltage regulator, the arm has a mounting potion at an end and the connector is disposed between the mounting potion and the regulator portion. Therefore, the location of the connector can be freely moved along the arm. In addition, because the arm is directly fixed to the frame, vibration of the connector can be effectively prevented. Further, because the connector is disposed at a portion separate from the accommodation space, the outside diameter of the rectifying unit can be made comparatively smaller.

In the above-stated rotary electric machine, the mounting potion and the connector may be respectively disposed at positions which are the same in distance from the rotation axis of the rotor. Therefore, the phase of the vibration can be made approximately the same, so that the magnitude of the vibration can be reduced. Further, the mounting potion may be disposed radially outside from a portion of the frame to which the rectifying unit is fixed. Therefore, assembling work can be made easier, and more effective cooling passages can be formed around the elements of the voltage regulator.

The arm preferably has an arc-shape to increase its rigidity. The voltage regulator may further include a wall member projecting toward the frame to prevent water from reaching the inside of the generator. The connector preferably extends in a direction parallel to the axis of the rotor to reduce the outside diameter of the generator.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

An ac generator according to a preferred embodiment of the present invention will be described with reference to the appended drawings.

Figure 1:
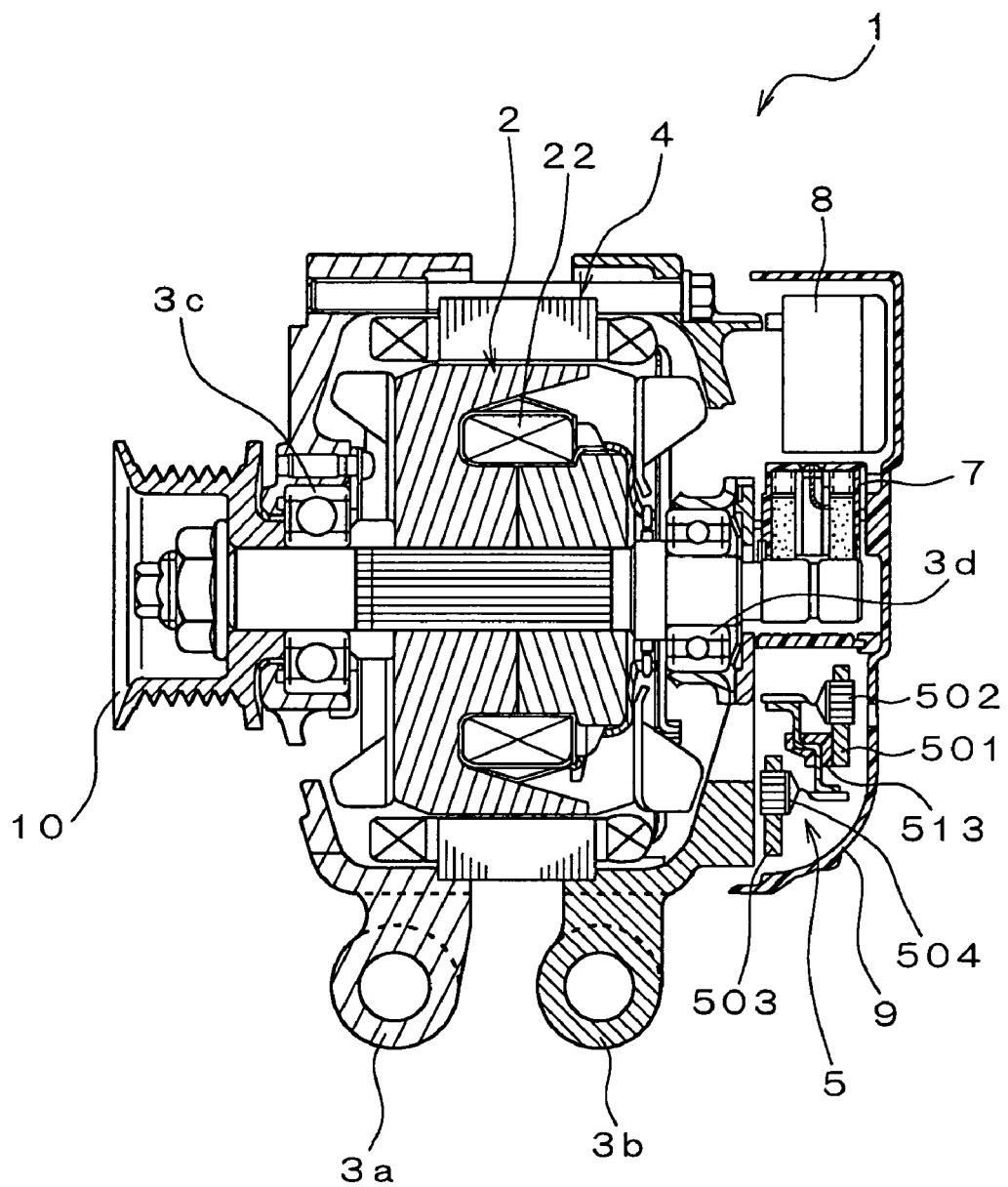
FIG. 1 is a longitudinal sectional view of an ac generator for a vehicle according to a preferred embodiment of the invention.

As shown in FIG. 1, an ac generator 1 for a vehicle includes a rotor 2 that includes a field coil 22, a pair of a front frame 3a and a rear frame 3b which supports the rotor 2 via a pair of front bearing 3c and rear bearing 3d, a stator 4 that functions as an armature, a rectifying unit 5 that converts ac power to dc power, a brush unit 7 that supplies field current to the field coil 22, a voltage regulator 8, a resinous protection cover 9 that is fixed to the rear frame to cover rectifying unit 5, the brush unit 7 and the voltage regulator 8, etc.

As shown in FIG. 1, the rectifying unit includes a pair of axially piled horseshoe type positive and negative cooling fins 501, 503 and a terminal unit 513. The positive cooling fin 501 has a plurality (e.g. six) of positive type diodes 502, and the negative cooling fin 503 has a plurality (e.g. six) of negative type diodes 504.

The terminal unit 513 includes an insulation member to insulate the positive cooling fin 501 and the negative cooling fin 503 from each other and conductive members to connect output ends of the stator 4 to the positive type and negative type diodes 502, 504 so as to convert ac power of the stator 4 to dc power.

Each positive type diode 502 has one end fitted to a hole formed in the positive cooling fin 501 and the other end having a lead terminal extending toward the negative cooling fin 503, and each negative type diode 504 has one end fitted to a hole formed in the negative cooling fin 503 and the other end having a lead terminal extending toward the positive cooling fin 501. The lead terminals are respectively connected to the conductive members of the terminal member 513 so that the diodes 502, 504 can form a pair of full-wave rectifying bridge circuits. An output terminal bolt 500 is fixed to the positive cooling fin 501 to output dc power from the terminal bolt 500.

The rectifying unit 5 is disposed between the rear frame 3b and the protection cover 9 and is fixed, together with the protection cover 9, to a support member for supporting a bearing box that accommodates the rear bearing 3d.

The negative fin 503 has a larger outside diameter than the positive cooling fin 501 and is located comparatively radially outside the positive cooling fin 501. The negative fin 503 has plural (e.g. four) mounting potions formed along the periphery thereof at equal intervals. The negative fin 503 is fixed at the mounting potions to the rear frame 3b by screws 510, so that heat of the negative fin 503 can be transmitted to the rear frame 3b.

The voltage regulator 8 and the brush unit 7 are disposed at an accommodation space formed at a peripheral portion of the rectifying unit, which includes the positive and negative cooling fins 501, 503 and a terminal unit 513. The voltage regulator 8 includes a regulator section 800 that is located at the accommodation space, a generally arc-shaped arm 804 that extends in a circumferential direction of the rear frame 3b and a connector 806. The arm 804 has a mounting potion 802 at an end. Because the arm 804 extends in an arc, the arm 804 becomes rigid and does not excessively project radially outward from the rear frame 3b.

The regulator section 800 includes an IC chip for regulating the output voltage of the ac generator 1 and a heat sink 808 that has a plurality of axially projecting cooling fins, which is located at the rear. The mounting potion 802 of the arc-shaped arm 804 slightly projects outward from the rear frame 3b in a radial direction.

The connector 806 has three connector terminals 810, 812, 814 and extends in parallel to the rotating axis of the rotor 2, so that the connector 806 does not project radially outward from the rear frame 3b. Incidentally, the connector may extends radially to reduce the axial length of the generator 1. The connector 806 is integrated with the regulator section 800 via the arm 804. The connector 806 and the mounting potion 802 are respectively located at the peripheral portions that have the same distance from rotating axis of the rotor 2. Therefore, the phase of vibration of the mounting potion 802 and the phase of the vibration of the connector 806, which are caused by rotation of the rotor 2, can be made equal so that the magnitude of the vibration of the connector 806 can be reduced.

Because the location of the connector 806 of the voltage regulator 8 is separated from the regulator section 800, the accommodation space can be made comparatively smaller. As a result, the outside diameter of the rectifying unit 5 can be made smaller.

Figure 7:
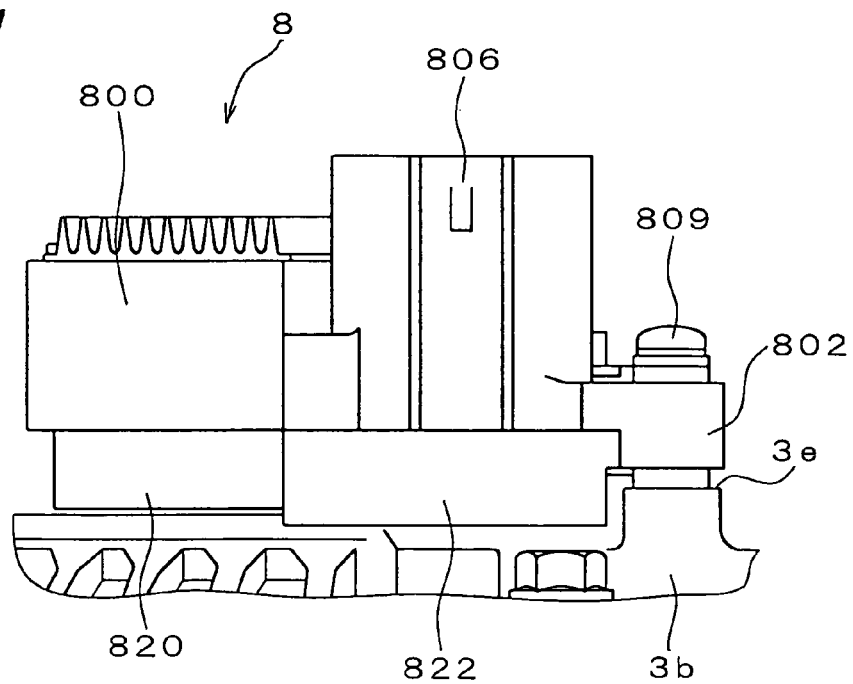
FIG. 7 is a fragmentary side view of the ac generator illustrating a portion around the voltage regulator.
Figure 8:
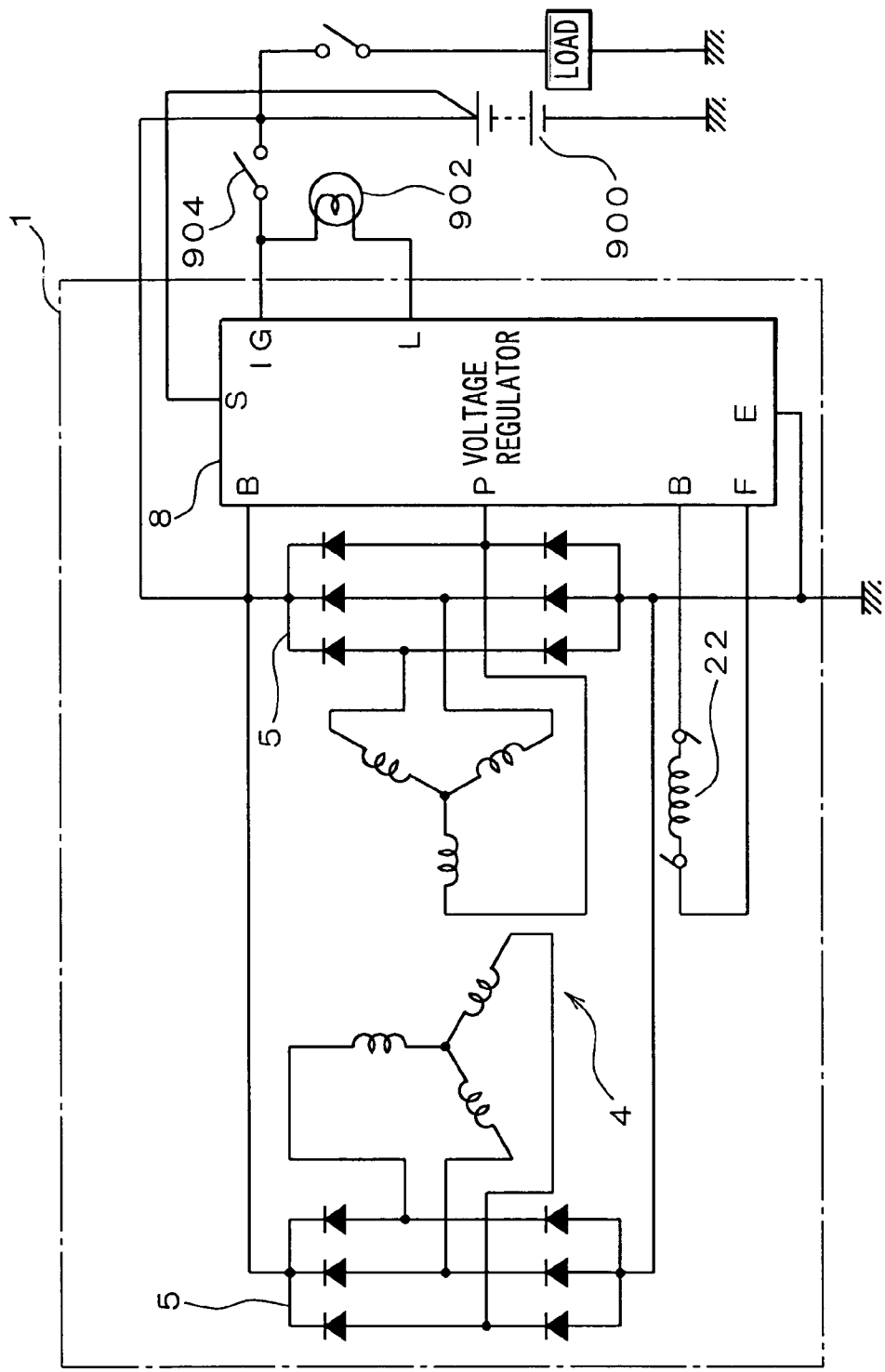
FIG. 8 is a circuit diagram of the ac generator.

As shown in FIG. 7, the mounting potion 802 is fixed to a surface 3e of the rear frame 3b by a bolt 809. Because the arm 804 is directly fixed to the rear frame at the mounting potion 802, vibration of the connector can be prevented.

Figure 2:
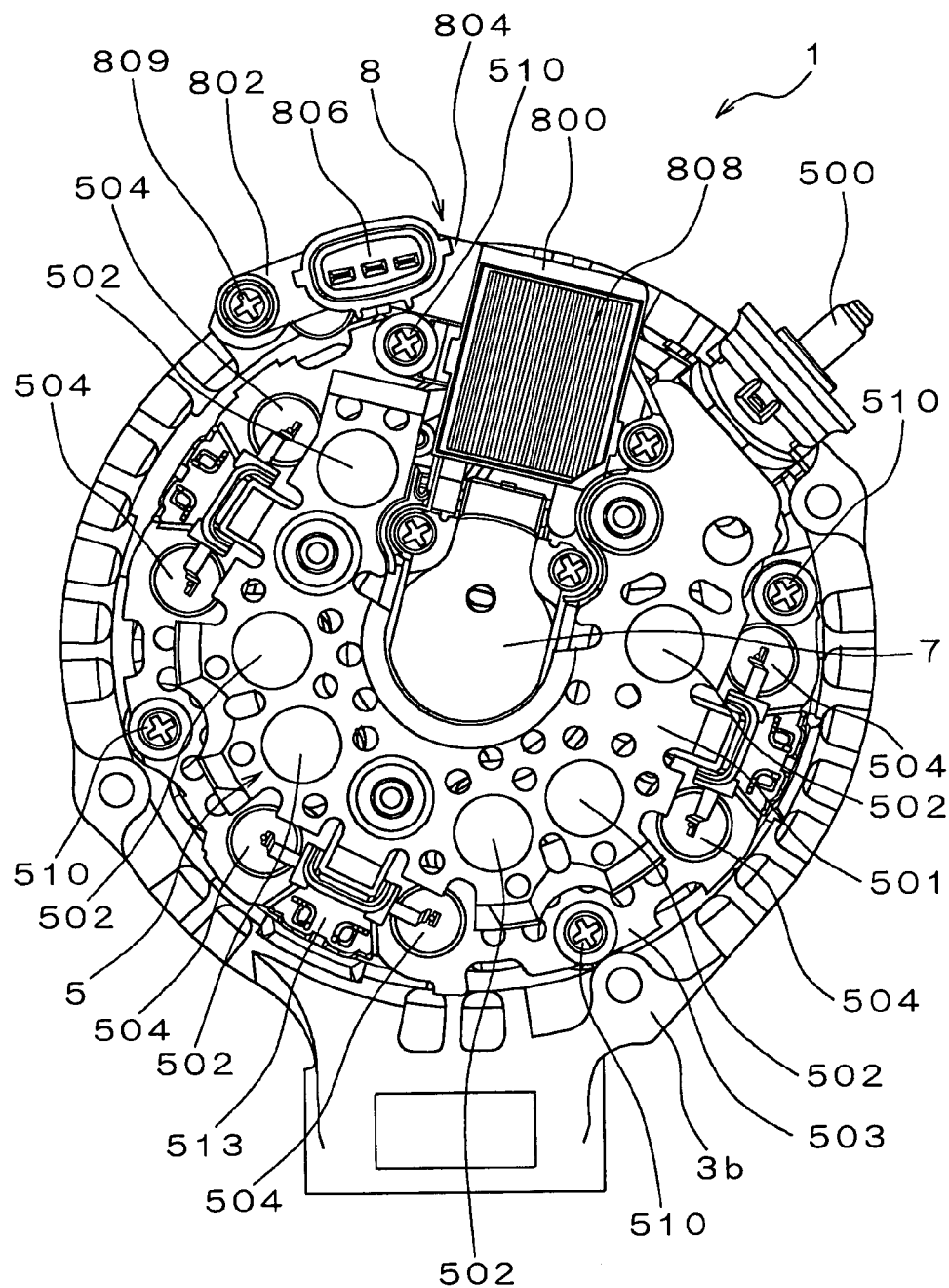
FIG. 2 a plan view of a rectifying unit of the ac generator and a voltage regulator thereof that are assembled into a unit.

Thus, mounting portions of the voltage regulator 8, which include the mounting potion 802 and the connection terminals 834, 836, are widely spread, so that assembling work of the voltage regulator 8 can be made easier. This is also effective to provide cooling air passages around the regulator section 800 and the connector 806, as shown in FIG. 2.

Figure 3:
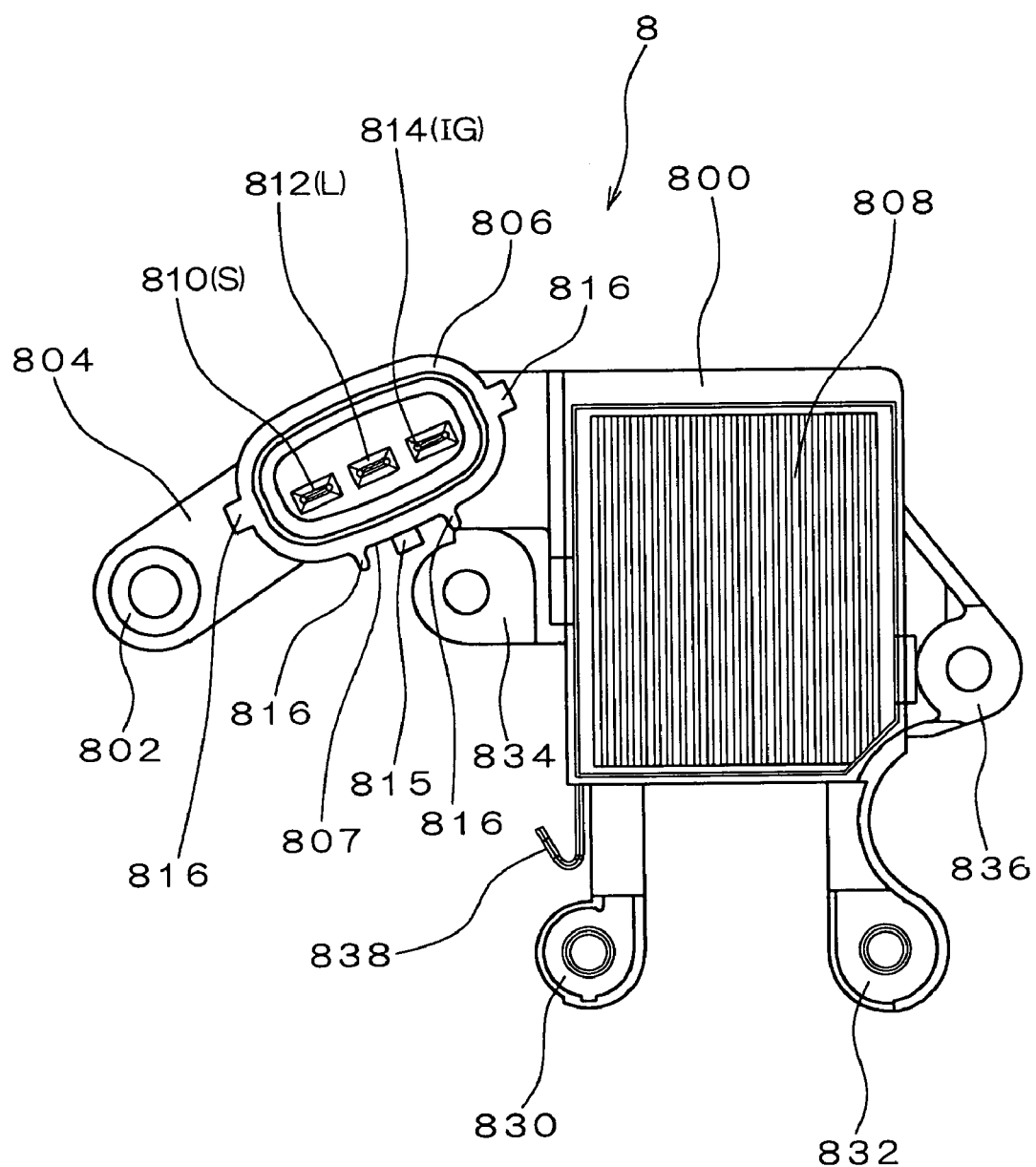
FIG. 3 is an enlarged plan view of the voltage regulator.
Figure 4:
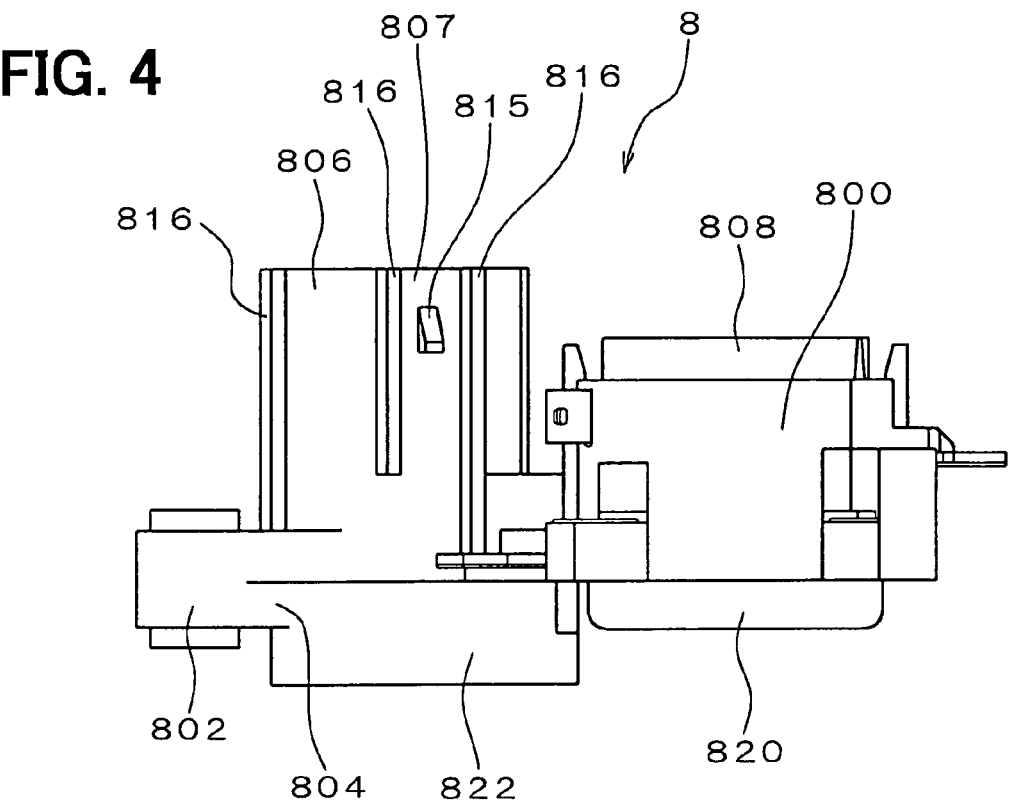
FIG. 4 is an enlarged side view of the voltage regulator.

As shown in FIGS. 3 and 4, the connector 806 has a lock member 815 at a radially inside surface 807 thereof. This location not only protects the lock member 815 from foreign material that may damage the lock member 815 but also makes assembling work of the connector 806, which is disposed among many accessories or parts, easier. The lock member 815 locks the connector 806 when it is coupled to a connector extended from a vehicle side member (not shown). The connector 806 also has a plurality of ribs or walls 816 that are formed at opposite sides of the lock member 815 to form a labyrinth in cooperation with the counterpart vehicle side connector to prevent water from approaching the lock member 815 and the terminals 810, 812, 814 disposed inside the connector 806.

Figure 5:
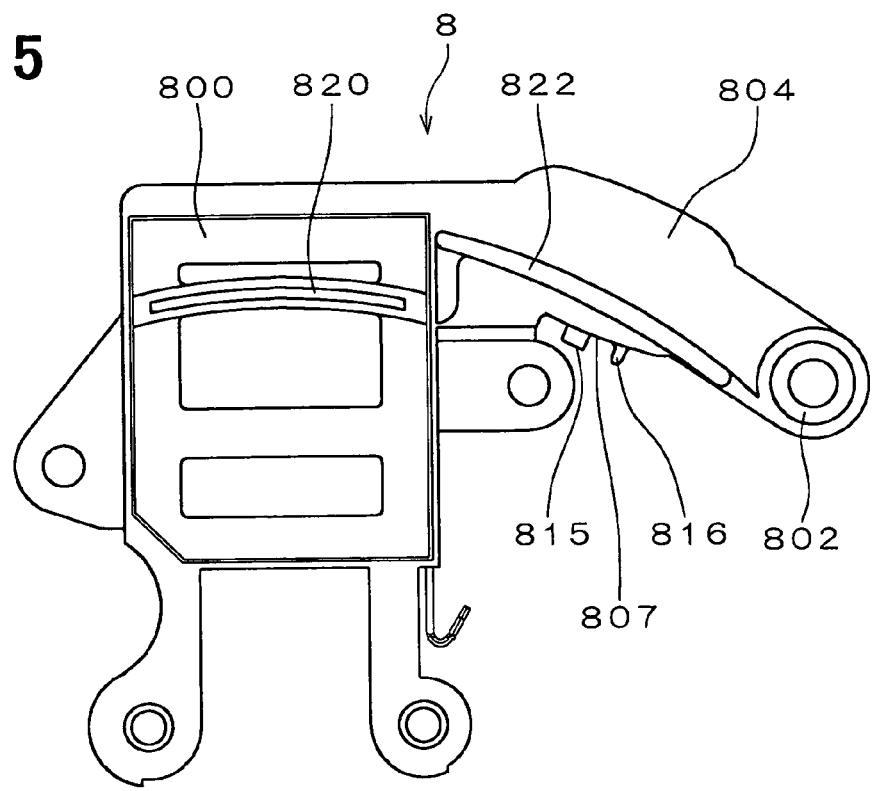
FIG. 5 is an enlarged bottom view of the voltage regulator.
Figure 6:
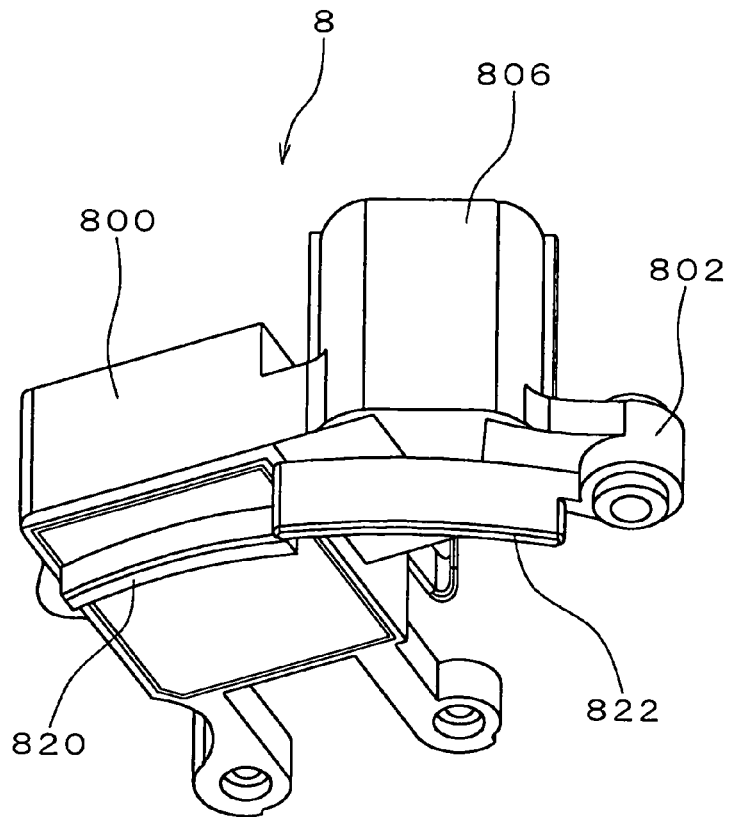
FIG. 6 is an enlarged perspective view of the voltage regulator.

As shown in FIGS. 4–6, the voltage regulator 8 has generally arc-shaped walls 820, 822 that have concentric arcs with respect to the rotating axis of the rotor 2. The first wall 820 fills a space between the regulator section 800 and the rear frame 3b, and the second wall 822 fills a space between the arm 804 and the rear frame 3b. The arc-shaped walls 820, 822 form a labyrinth that prevents water from entering the inside of the frame 3b and a reinforcement member to increase the rigidity of the voltage regulator 8 in the rotation direction of the rotor 2.

The voltage regulator 800 has a pair of terminals 830, 832 connected to the brush unit 7 and three terminals 834, 836, 838 connected to the rectifying unit 5. In more detail, the pair of terminals 830, 832 are respectively F-terminal and B terminal, which are connected across the field coil 22. The terminal 834 is E-terminal that is connected to the negative cooling fin 503, the terminal 836 is B-terminal that is connected to the positive cooling fin 501 and internally connected to the terminal 832, and the terminal 838 is P-terminal that is connected to one of three phase windings of the stator 4. The connector terminals 810, 812, 814 are, respectively, S-terminal that is connected to the positive side terminal of a battery 900, L-terminal that is connected to an alarm lamp 902 and IG-terminal that is connected to an ignition switch 904. They are connected by cables extended in parallel to the rotation axis of the rotor 2.

Figure 9:
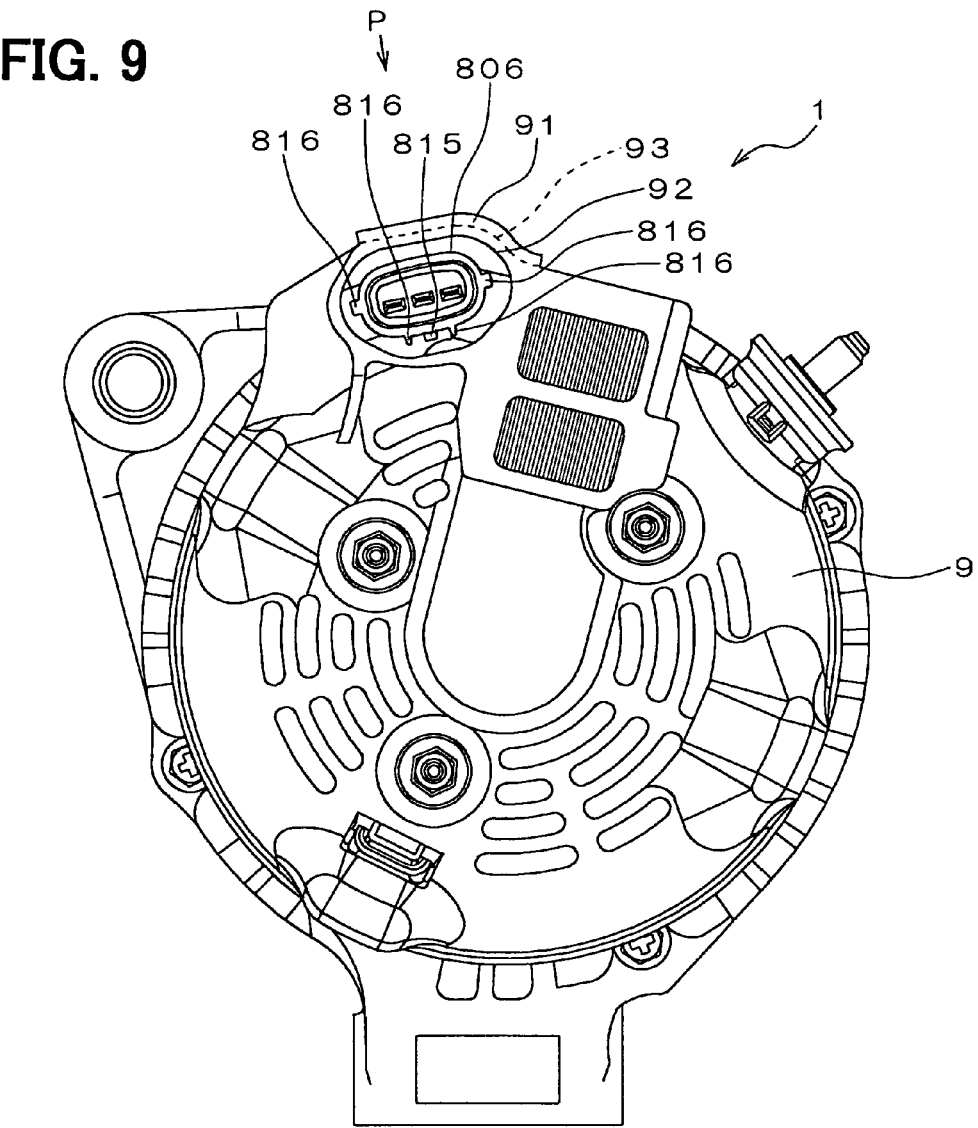
FIG. 9 is a plan view of a portion of the ac generator with a protection cover mounted in the ac generator.
Figure 10:
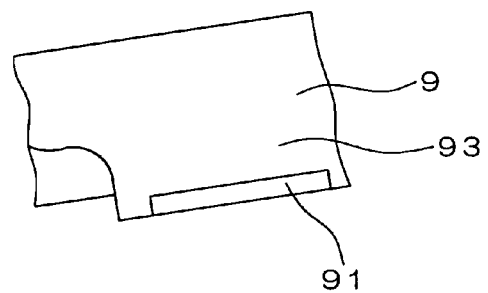
FIG. 10 is a fragmentary view of the protection cover viewed from a portion P in FIG. 9.

The protection cover 9 has an opening 92 that opens to the connector 806 of the voltage regulator 8 and extends in parallel with the axis of the rotor 2. As shown in FIGS. 9 and 10, a rib or wall 91 is formed at a portion 93 around the opening 92 to prevent water from approaching the connector 806.

With the above structure, the connector 806 can be freely located along the arm 804.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A rotary electric machine, comprising:
    a frame;
    a rectifying unit fixed to said frame, said rectifying unit having an accommodation space on a peripheral portion;
    a rotor accommodated in said frame;
    a voltage regulator having a regulator section disposed in the accommodation space, an arm extending outward from said regulator section in a circumferential direction of said frame and a connector;
    wherein:
    said arm has a mounting portion at an end thereof, which is fixed to a peripheral portion of said frame; and
    said connector is disposed on said arm between said mounting portion and said regulator portion to be separately located from said regulator portion.

2. The rotary electric machine as claimed in claim 1, wherein said mounting portion and said connector are respectively disposed at positions which have the same distance from the rotation axis of said rotor.

3. The rotary electric machine as claimed in claim 1, wherein said mounting portion is disposed radially outside from a portion of said frame to which said rectifying unit is fixed.

4. The rotary electric machine as claimed in claim 1, wherein said arm comprises an arc-shaped member.

5. The rotary electric machine as claimed in claim 1, wherein said voltage regulator further comprises a wall member projecting toward said frame.

6. The rotary electric machine as claimed in claim 1, wherein said connector extends in a direction parallel to the axis of said rotor.

7. The rotary electric machine as claimed in claim 1, wherein said connector extends in a direction perpendicular to the axis of said rotor.

8. The rotary electric machine as claimed in claim 1, wherein said arm has an arc-shape.

9. The rotary electric machine as claimed in claim 8, wherein said connector and said mounting portion are respectively located at the same distance from the rotating axis of said rotor.

10. A rotary electric machine, comprising:
    a frame;
    a rectifying unit fixed to said frame, said rectifying unit having a cooling fin made of conductive material;
    a rotor supported by said frame;
    a voltage regulator having a regulator section, an arm extending outward from said regulator section in a circumferential direction of said frame and a connector disposed on said arm to be located separately from said regulator section to be connected to an outside connector;
    wherein said connector extends in a direction parallel to a rotating axis of said rotor and has a lock member to be engaged with the outside connector and said arm is fixed to a peripheral portion of said frame.

11. The rotary electric machine as claimed in claim 10, wherein said connector has a wall member that prevents water from reaching said lock member.

12. The rotary electric machine as claimed in claim 11, wherein said wall member comprises a pair of ribs formed around said lock member.

13. The rotary electric machine as claimed in claim 10, further comprising a protection cover for covering said voltage regulator and a wall member for preventing water from reaching the inside of said protection cover, wherein said protection cover has an opening from which said connector extends.

14. The rotary electric machine as claimed in claim 13, wherein said wall member comprises a rib formed around said opening.

15. The rotary electric machine as claimed in claim 10, wherein said arm has an arc-shape.

16. The rotary electric machine as claimed in claim 15, wherein said connector and said mounting portion are respectively located at the same distance from the rotating axis of said rotor.

* * * * *